United States Patent
Baek et al.

(10) Patent No.: US 9,065,092 B2
(45) Date of Patent: Jun. 23, 2015

(54) SECONDARY BATTERY

(75) Inventors: Woon-Seong Baek, Yongin-si (KR);
Woo-Choul Kim, Yongin-si (KR);
Jong-Wook Yoon, Yongin-si (KR)

(73) Assignee: Samsung SDI Co., Ltd., Yongin-Si (KR)

( * ) Notice: Subject to any disclaimer, the term of this patent is extended or adjusted under 35 U.S.C. 154(b) by 592 days.

(21) Appl. No.: 12/857,468

(22) Filed: Aug. 16, 2010

(65) Prior Publication Data

US 2011/0129694 A1    Jun. 2, 2011

Related U.S. Application Data

(60) Provisional application No. 61/265,238, filed on Nov. 30, 2009.

(51) Int. Cl.
*H01M 2/00* (2006.01)
*H01M 2/26* (2006.01)
*H01M 10/00* (2006.01)
*H01M 2/04* (2006.01)
*H01M 10/42* (2006.01)

(52) U.S. Cl.
CPC .......... *H01M 2/0404* (2013.01); *H01M 10/425* (2013.01)

(58) Field of Classification Search
CPC .......... H01M 10/4257; H01M 2/0202; H01M 2/0404; H01M 2/30; H01M 2/348; H01M 10/425; H01M 10/48; H02J 7/0029; H02J 7/0031; H02J 7/0068
USPC .......... 429/7, 61, 62, 163, 65, 121, 122, 123, 429/170, 178; 361/760, 106; 320/128, 134
See application file for complete search history.

(56) References Cited

U.S. PATENT DOCUMENTS

| | | | |
|---|---|---|---|
| 7,462,416 B2* | 12/2008 | Kim | ................................. 429/62 |
| 7,510,791 B2 | 3/2009 | Moon et al. | |
| 7,754,378 B2* | 7/2010 | Yim et al. | ..................... 429/171 |
| 2003/0170530 A1 | 9/2003 | Nishimura et al. | |
| 2008/0107964 A1 | 5/2008 | Choi | |
| 2008/0118825 A1 | 5/2008 | Yoon | |
| 2008/0176131 A1 | 7/2008 | Byun et al. | |

(Continued)

FOREIGN PATENT DOCUMENTS

| | | |
|---|---|---|
| CN | 101174706 | 5/2008 |
| CN | 101192658 | 6/2008 |

(Continued)

OTHER PUBLICATIONS

Extended Search Report dated Apr. 5, 2011 for corresponding EP Application 10251591.3.

(Continued)

*Primary Examiner* — Barbara Gilliam
*Assistant Examiner* — Angela Martin
(74) *Attorney, Agent, or Firm* — Knobbe Martens Olson & Bear LLP

(57) ABSTRACT

A secondary battery having a protecting circuit module (PCM) and a secondary protection device. The battery includes a metal tab of the PCM and a metal tab of the secondary protection device that are connected to each other on the top of the PCM. One or more of the tabs are bent to bring the tabs in closer proximity to facilitate welding therebetween.

20 Claims, 5 Drawing Sheets

(56) References Cited

U.S. PATENT DOCUMENTS

| | | | |
|---|---|---|---|
| 2009/0086398 A1* | 4/2009 | Jang | 361/106 |
| 2009/0092860 A1 | 4/2009 | Yamamoto et al. | |
| 2009/0155684 A1 | 6/2009 | Jang et al. | |
| 2010/0143788 A1* | 6/2010 | Koh et al. | 429/163 |
| 2012/0070702 A1* | 3/2012 | Byun et al. | 429/7 |

FOREIGN PATENT DOCUMENTS

| | | |
|---|---|---|
| CN | 101226995 | 7/2008 |
| CN | 101312237 | 11/2008 |
| CN | 101459235 | 6/2009 |
| EP | 1 071 147 A1 | 1/2001 |
| JP | 2002-231201 | 8/2002 |
| JP | 2003-197165 | 7/2003 |
| JP | 2008-300245 | 12/2008 |
| JP | 2009-087920 A | 4/2009 |
| JP | 2009-099542 A | 5/2009 |
| KR | 10 20040029757 | 4/2004 |
| KR | 10 20060046292 | 5/2006 |
| KR | 100685115 | 2/2007 |
| KR | 100685605 | 2/2007 |
| KR | 20070096775 | 10/2007 |
| KR | 10 20090047686 | 5/2009 |
| WO | WO 2009/078585 | 6/2009 |

OTHER PUBLICATIONS

Office Action dated Dec. 11, 2012 for corresponding JP Application No. 2010-243970.

Office Action dated Oct. 31, 2012 for corresponding KR application 10-2010-0085952.

Office Action dated Feb. 27, 2013 for corresponding CN Application No. 201010565503.5.

* cited by examiner

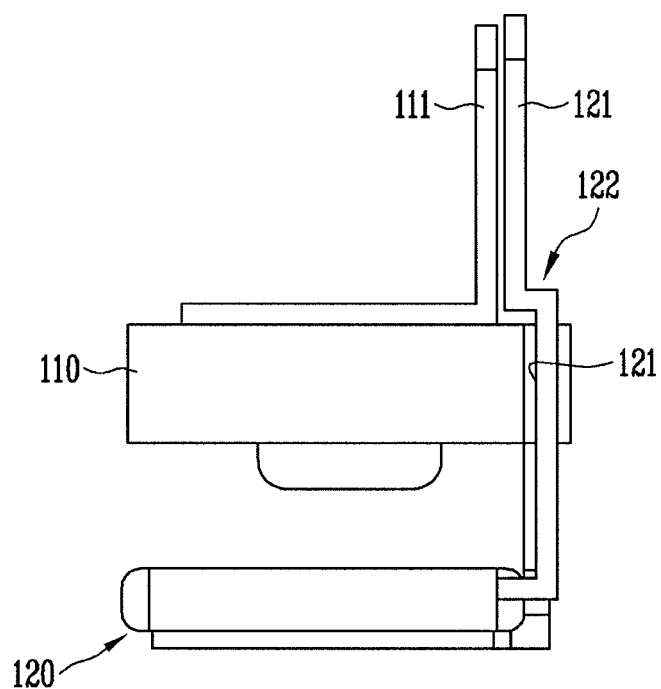
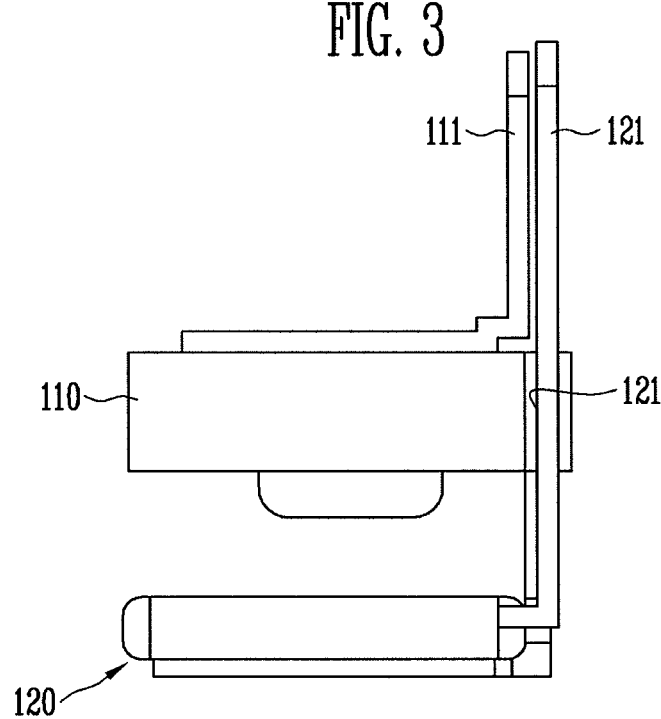

SECONDARY BATTERY

RELATED APPLICATIONS

This application claims the benefit of U.S. Provisional Application No. 61/265,238, filed Nov. 30, 2009, the entire content of which is incorporated herein by reference.

BACKGROUND

1. Field of the Invention

An embodiment relates to a secondary battery and, more particularly, to a secondary battery capable of reducing poor welding or soldering between metal tabs while improving the binding force between a metal tab of a protecting circuit module (PCM) and a metal tab of a secondary protection device.

2. Discussion of Related Art

In general, a secondary battery is a battery in which inter-conversion between chemical energy and electrical energy is reversible, such that charging and discharging can repetitively be performed. Secondary batteries are raising a lot of interest as a driving power supply for mobile and portable IT devices due to their decrease in weight and increase in functionality.

The secondary battery includes a nickel-cadmium battery, a nickel-hydrogen battery, a nickel-zinc battery, a lithium secondary battery, etc. Among them, since the lithium secondary battery is rechargeable and can have a small size, a high capacity, a high operating voltage and high energy density per unit weight, lithium batteries are widely used in an advanced electronic apparatus field Lithium batteries include lithium-ion batteries, lithium-ion polymer batteries, lithium polymer batteries, etc.

The secondary battery in the related art includes safety devices, such as the protecting circuit module (PCM) and the secondary protection device, in order to prevent an increase in high temperature, overcharge and overdischarge, or the like. In addition, the PCM and the secondary protection device may be provided together. In this case, a secondary protection device is connected to one end of the PCM and a cell is connected to the other end of the PCM. Further, the secondary protection device is attached between the cell and the PCM and likewise protects the cell from overcurrent and heat emission of the cell.

In addition, the secondary protection device is connected to the PCM through welding to the metal tab seated on the PCM and, in this process, a problem often occurs. Since the position where the metal tab outside of the PCM is typically seated may be spaced from a position where the metal tab of the secondary protection device is typically seated, poor welding can occur or one-side of a metal tab is spaced apart during welding of the metal tabs.

SUMMARY OF THE INVENTION

In order to solve the above-mentioned problem, it is possible to improve the reliability of quality by reducing poor welding or soldering between metal tabs and preventing a tab attached to a PCM from being spaced apart during welding to improve the binding force between the tabs.

In one aspect of the present invention, a secondary battery having a protecting circuit module (PCM) and a secondary protection device is provided. In this aspect, a metal tab of the PCM and a metal tab of a secondary protection device are connected to each other on the top of the PCM one or more of the metal tabs of the PCM or the secondary protection device is bent to be in closer contact with the other one.

According to another aspect of the present invention, a passing portion through which the metal tab of the secondary protection device passes is formed in the PCM.

According to another aspect of the present invention, the passing portion has a groove or hole shape.

According to another aspect of the present invention, the metal tabs of the PCM and the secondary protection device are connected to each other by welding or soldering.

According to another aspect of the present invention, a hole for welding is formed on both long-end and side-end surfaces in the upper case in order to inter-weld the secondary protection device and the metal tab. In addition, an additional separator may be provided in the upper case in order to protect the PCM from sparks generated while inter-welding the metal tabs.

A secondary battery according to an embodiment of the present invention, reduces poor welding or soldering between metal tabs, moves a metal tab attached to a PCM and a secondary protection device together and improves the manufacturing process of the battery as a result of better binding force between the metal tab of the PCM and a metal tab of a secondary protection device.

BRIEF DESCRIPTION OF THE DRAWINGS

The accompanying drawings, together with the specification illustrate exemplary embodiments of the present invention, and, together with the description, serve to explain the principles of the present invention.

FIG. 2 is a cross-sectional view showing a PCM and a secondary protection device according to an embodiment of the present invention;

FIG. 3 is a cross-sectional view showing a PCM and a secondary protection device according to another embodiment of the present invention;

DETAILED DESCRIPTION OF THE INVENTION

Hereinafter, embodiments of the present invention will be described in detail with reference to the accompanying drawings. Further, the embodiment of the present invention provides to more completely describe the present invention to those skilled in the art and the embodiment described below may be modified in various other forms and the scope of the present invention is not limited to the embodiment described below.

Figure 1A:
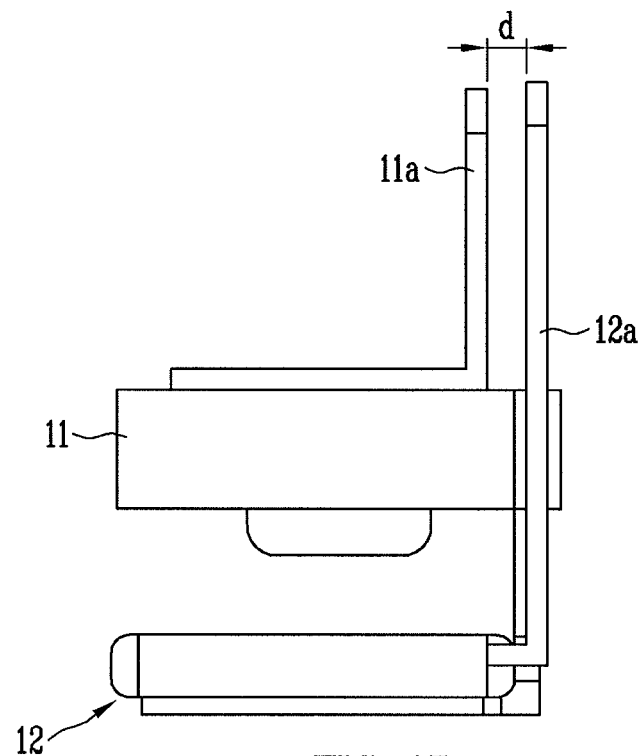
FIG. 1A is a cross-sectional view of a prior art metal tab of a PCM and a metal tab of a secondary protection device in a secondary battery illustrating the potential separation.
Figure 1B:
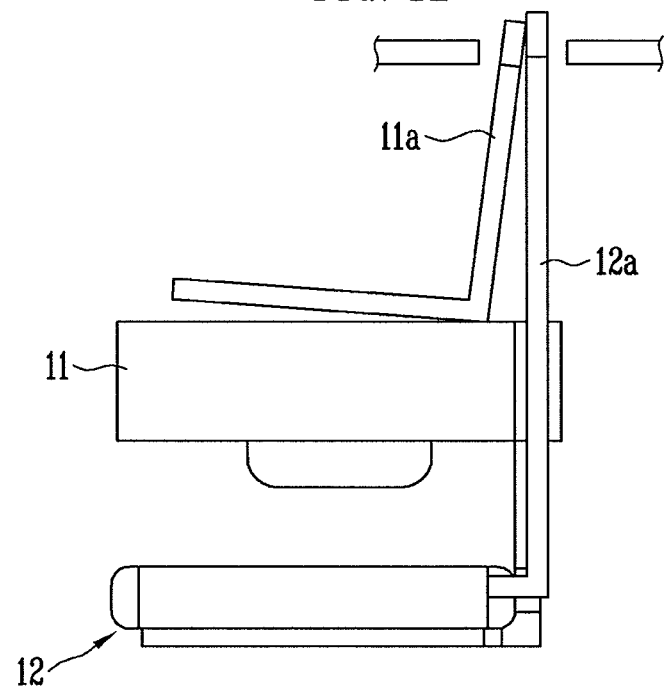
FIG. 1B is a cross-sectional view of the metal tab of a PCM in FIG. 1A as it is partially separated from the PCM during welding due to the spacing shown in FIG. 1A.

FIG. 1A is a diagram showing a state in which a metal tab of a PCM and a metal tab of a secondary protection device are spaced from each other in the prior art and FIG. 1B is a diagram showing a state in which a part of one metal tab is dislodged during welding with a metal tab that is spaced apart. Herein, the secondary protection device 12 is attached between a cell (not shown) and the PCM 11 to protect the cell from overcurrent and heat emission of the cell. The secondary protection device 12 is connected to one end of the PCM 11 and the cell is connected to the other end of the PCM 11, such that it is possible to use the cell for a long time while safely protecting the cell by controlling overcharge and overdischarge with power supplied from the outside.

However, as shown in FIGS. 1A and 1B, in the secondary battery 10, the metal tab 11a of the PCM 11 and the metal tab 12a of the secondary protection device 12 are welded to each other while being spaced from each other. A spacing distance d is generated between the metal tabs 11a and 12a due to a distance between the PCM 11 and a position where the metal tab 11a is seated which is a result of the manufacturing process of the PCM 11. In general, when the spacing distance is 0.2 mm or more, poor welding occurs when the metal tabs 11a and 12a are welded to each other. This can result in the metal tab 11a of the PCM separating from the PCM 11 as shown in FIG. 1B, thereby deteriorating the reliability of an operation and quality of a product.

FIG. 2 is a diagram showing a state in which a metal tab 121 of a secondary protection device is bent and in close contact with a PCM 110 in order to address the above-mentioned problem. As shown in FIG. 2, in the secondary battery 100 according to the present invention, a metal tab 111 of a protecting circuit module (PCM) 110 and a metal tab 121 of a secondary protection device 120 are connected to each other on the top of the PCM 110. As is also shown in FIG. 2, a bent portion 122 bending the metal tab 121 of the secondary protection device 120 on the top of the PCM is formed so as to bring the tab 121 and the tab 111 in closer proximity.

FIG. 3 is a diagram that illustrates that the metal tab 111 of the PCM is bent on the top of the PCM 110 without bending the metal tab 121 of the secondary protection device so as to position the tabs 111 and 121 in closer proximity. As shown in FIGS. 2 and 3, any one of the metal tabs 111 and 121 of the PCM 110 and the secondary protection device 120 may be bent to be in close contact with the other one. In the embodiment shown in FIG. 2, the metal tab 121 of the secondary protection device 120 is bent to be in close contact with the metal tab 111 of the PCM 110. For this, the metal tab 121 of the secondary protection device 120 may have a bent portion 122 positioned on the top of the PCM 110. Likewise, in FIG. 3, the metal tab 111 of the PCM 110 is bent on the top of the PCM 110 to be in close contact with the metal tab 121 of the secondary protection device 120.

The metal tab 121 may be made of various materials for electrical transmission and may, in one embodiment, use a nickel tab (Ni-tab).

The bent portion may be formed by one-time bending or may be bent in any of a number of different manners and may have a bending structure of various types so that the metal tab of the PCM 110 and the metal tab 121 of the secondary protection device 120 are in closer contact with each other.

Figure 4A:
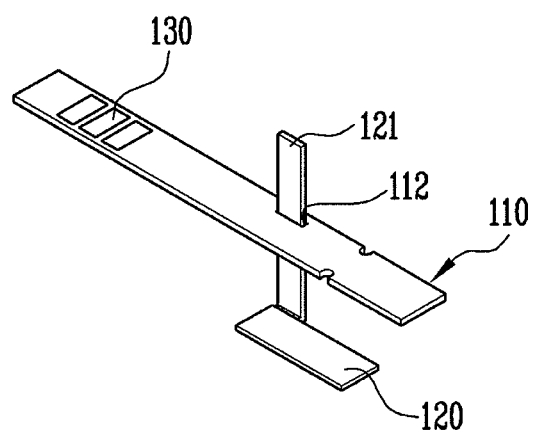
FIG. 4A is a perspective view of a PCM having a hole through which a metal tab of a secondary protection device passes.
Figure 4B:
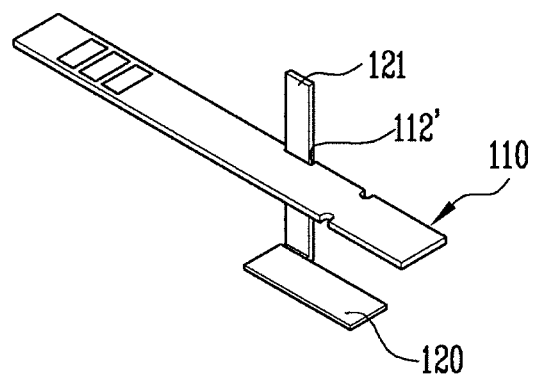
FIG. 4B is a perspective view of a PCM having a groove through which a metal tab of a secondary protection device passes.

FIGS. 4A and 4B are diagrams showing one embodiment in which a metal tab of a secondary protection device passes through a PCM. The secondary protection device 120 is positioned below the PCM 110 and the metal tab 121 of the secondary protection device 120 may be formed so as to extend to the top of the PCM 110. For example, a passing portion for passing the metal tab 121 of the secondary protection device 120 may be formed in the PCM 110 in order to connect the secondary protection device 120 to the PCM 110. The passing portion may have a shape of a groove 112 (FIG. 4B) of which one side is opened in the PCM or a shape of a hole 112 (FIG. 4A) and may be formed to have a shape corresponding to a shape of the metal tab 121.

Figure 5:
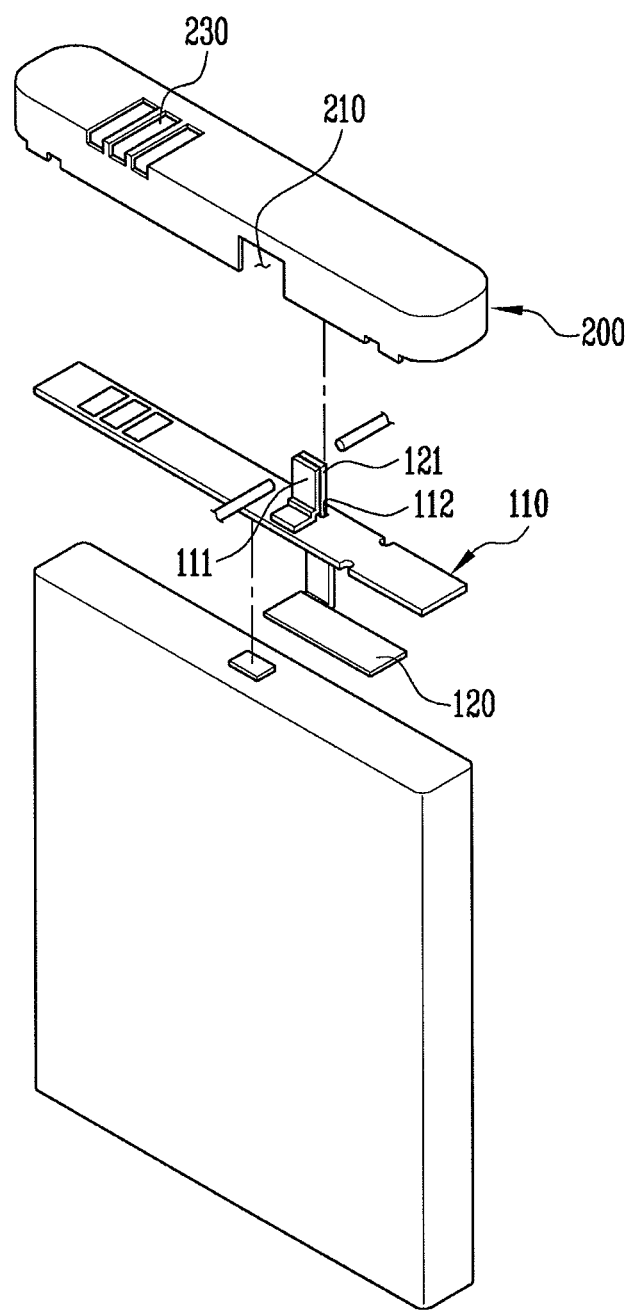
FIG. 5 is a schematic diagram showing a PCM and a secondary protection device of the present invention coupled to an upper case.
Figure 6A:
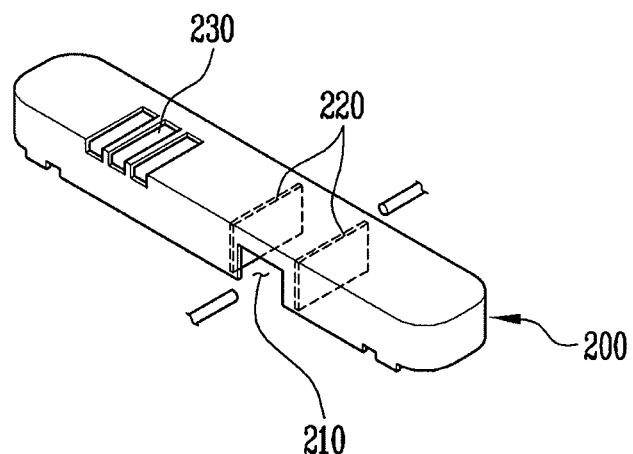
FIG. 6A is a schematic perspective view of an upper case relating to one embodiment of the present invention.

FIG. 5 is a schematic diagram illustrating a PCM and a secondary protection device of one embodiment of the present invention coupled to an upper case. FIG. 6A is a schematic perspective view of an upper case according to one embodiment of the present invention and FIG. 6B is a bottom perspective view of an upper case according to one embodiment of the present invention.

As shown, an additional spacing portion 210 may be formed in the upper case 200 in which the PCM is seated in order to inter-weld and connect the metal tab 111 of the PCM and the metal tab 112 of the secondary protection device to each other. The spacing portion 210 is a space for locating a welding rod for inter-welding the metal tabs 111 and 112. The spacing portion 210 may be formed on both long-end and side-end surfaces of the upper case 200. In one embodiment of the present invention, the metal tabs 111 and 121 of the PCM 110 and the secondary protection device 120 can be connected to each other by welding or soldering to more stably and accurately connect to each other. Alternatively, the tabs connect to each other as a result of being heated by heat and may be connected to each other via a medium member made of a conductive material. Welding used herein may include resistance welding or performing welding with resistance heat by allowing high current to flow.

Figure 6B:
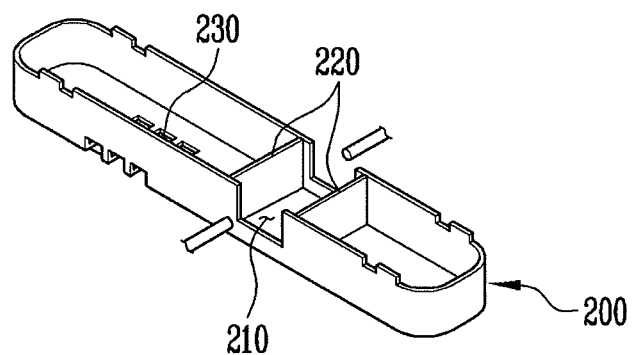
FIG. 6B is a bottom perspective view of an upper case relating to one embodiment of the present invention.

FIGS. 6A and 6B are diagrams more specifically showing an upper case according to one embodiment of the present invention. In the present invention, the additional spacing portion 210 for resistance-welding may be formed in the upper case 200 and an additional separator 220 may be formed inside on the top surface of the upper case 200 in order to protect the PCM 110 from sparks, etc. generated during welding. The welding rod is positioned between the separators 220, such that when the metal tabs 111 and 121 are inter-welded to each other the separators 220 serve as a protection wall to reduce damage to the other parts of the PCM. In FIG. 6, reference numeral 230 represents a terminal hole.

Further, the secondary battery 100 according to the present invention may be a battery of which a case has a cylindrical shape housing an electrode assembly or a rectangular shape and the secondary battery 100 may also be formed of a polymer type.

An operation of the secondary battery 100 according to the present invention having the above-mentioned configuration will be described below.

The metal tab 111 of the PCM 110 and the metal tab 121 of the secondary protection device 120 can be connected to each other on the top of the PCM 110, such that it is possible to reduce poor access in welding or soldering the metal tabs while improving binding force between the metal tabs 111 and 121 by minimizing or removing the distance between the metal tabs 111 and 121.

Further, any one of the metal tabs 111 and 121 of the PCM 110 and the secondary protection device 120 can be bent to be in close contact with the other one. A bent portion is formed, for example, by bending the metal tab 121 of the secondary protection device 120, such that a shape of the metal tab 121 of the secondary protection device 120 coincides with a shape of the metal tab 111 of the PCM 110. Thus, the metal tab 121 attached to the PCM 110 is closer to the metal tab 111 on the top of the PCM 110 in order to improve weldability. Alternatively, the metal tab 111 is bent to bring the tabs 111 and 121 closer together for welding. Further, welding is facilitated by forming the additional welding spacing portion 210 in the upper case 200 and, in addition, an additional separator 230 for protecting the device such as the PCM 110, etc. from sparks generated while the welding may additionally be formed in the upper case 200.

The secondary battery 100, according to the present invention, stabilizes the manufacturing process by improving the reliability of the connection between the PCM 110 and the secondary protection device 120 and further improves the assembling of the battery 110 and its reliability and operation.

As described above, although a detailed embodiment has been described in detail, various modifications can be made without departing from the spirit of the present invention. Accordingly, the scope of the present invention should not be limited based on the described embodiments and should be determined in light of the appended claims to be described below and equivalents thereto.

What is claimed is:

1. A protective assembly for a secondary battery, the protective assembly comprising:
   a protection circuit module (PCM) having a first and second surface;
   a secondary protection device that is positioned adjacent a first surface of the PCM;
   a PCM tab that has a portion that extends perpendicularly outwards from a second surface of the PCM;
   a secondary protection device tab that has a portion that extends outward from the secondary protection device so as to extend towards the PCM and wherein the secondary protection device tab includes a portion that extends perpendicularly outward from the second surface of the PCM so that a first end of the PCM tab and a first end of the secondary protection device tab are positioned proximate each other on the portions of the PCM tab and secondary protection tab that extend perpendicularly outward from the second surface of the PCM and are connected together adjacent the second surface of the PCM and wherein at least one of the PCM tab and the secondary protection device tab includes a lateral contour formed adjacent the second surface of the PCM that reduces the distance between the portion of the PCM tab and the secondary protection device tab that extends outward from the second surface of the PCM to thereby facilitate connection there between and wherein the lateral contour comprises a bend formed in the portion of the secondary protection device tab or in the portion of the PCM tab that is extending outward from the second surface of the PCM.

2. The assembly of claim 1, wherein the PCM defines an opening through which the extending portion of the secondary protection device tab extends so as to extend outward from the second surface of the PCM.

3. The assembly of claim 2, wherein the opening comprises a groove formed adjacent a side edge of the PCM.

4. The assembly of claim 2, wherein the opening comprises an opening that extends through the PCM so as to be spaced from a side edge of the PCM.

5. The assembly of claim 1, wherein the secondary protection device tab includes a lateral contour that extends the secondary protection device tab towards the PCM tab.

6. The assembly of claim 5, wherein the lateral contour comprises a bend formed in the portion of the secondary protection device tab that is extending outward from the second surface of the PCM.

7. The assembly of claim 1, wherein the PCM tab includes a lateral contour that extends the PCM tab towards the secondary protection device tab.

8. The assembly of claim 7, wherein the lateral contour comprises a bend formed in the portion of the PCM tab that is extending outward from the second surface of the PCM.

9. The assembly of claim 8, wherein the PCM tab includes a first portion that is mounted on the PCM and a second portion that extends outward there from and wherein the bend is interposed between the first and second portions.

10. The assembly of claim 9, wherein the bend comprises a third portion that is vertically interposed between the first and second portions wherein the third portion extends in a direction that is perpendicular to the direction of the second portion.

11. The assembly of claim 1, further comprising an upper case that is positioned over the PCM and the secondary protection device.

12. The assembly of claim 11, wherein the upper case include sidewalls that define a recess that receives the PCM and the secondary protection device.

13. The assembly of claim 12, wherein at least one opening is formed in the side walls of the upper case adjacent the interface between the PCM tab and the secondary protection device tab so as to facilitate access to the interface during connection of the tabs.

14. The assembly of claim 13, wherein at least one separator is formed in the recess so as to separate the tabs from the PCM so as to provide protection to the PCM during connection of the tabs.

15. A secondary battery, comprising:
   a bare cell;
   a protection circuit module (PCM) having a first and second surface electrically coupled to the bare cell;
   a secondary protection device that is positioned adjacent a first surface of the PCM;
   a PCM tab that has a portion that extends perpendicularly outwards from a second surface of the PCM;
   a secondary protection device tab that has a portion that extends perpendicularly outward from the secondary protection device so as to extend towards the PCM and wherein the secondary protection device tab includes a portion that extends outward from the second surface of the PCM so that a first end of the PCM tab and a first end of the secondary protection device tab are positioned proximate each other on the portions of the PCM tab and secondary protection tab that extend perpendicularly outward from the second surface of the PCM and are connected together adjacent the second surface of the PCM and wherein at least one of the PCM tab and the secondary protection device tab includes a lateral contour formed adjacent the second surface of the PCM that reduces the distance between the portion of the PCM tab and the secondary protection device tab that extends outward from the second surface of the PCM to thereby facilitate connection there between and wherein the lateral contour comprises a bend formed in the portion of the secondary protection device tab or in the portion of the PCM tab that is extending outward from the second surface of the PCM.

16. The assembly of claim 15, wherein the PCM defines an opening through which the extending portion of the secondary protection device tab extends so as to extend outward from the second surface of the PCM and wherein the opening comprises either a groove formed adjacent a side edge of the PCM or an opening that extends through the PCM so as to be spaced from a side edge of the PCM.

17. The assembly of claim 15, wherein the secondary protection device tab includes a lateral contour that extends the secondary protection device tab towards the PCM tab and wherein the lateral contour comprises a bend formed in the portion of the secondary protection device tab that is extending outward from the second surface of the PCM.

18. The assembly of claim 15, wherein the PCM tab includes a lateral contour that extends the PCM tab towards the secondary protection device tab and wherein the lateral contour comprises a bend formed in the portion of the PCM tab that is extending outward from the second surface of the PCM.

19. The assembly of claim 15, further comprising an upper case that is positioned over the PCM and the secondary protection device.

20. The assembly of claim 19, wherein the upper case include sidewalls that define a recess that receives the PCM and the secondary protection device and wherein at least one opening is formed in the side walls of the upper case adjacent the interface between the PCM tab and the secondary protection device tab so as to facilitate access to the interface during connection of the tabs and wherein at least one separator is formed in the recess so as to separate the tabs from the PCM so as to provide protection to the PCM during connection of the tabs.

* * * * *